United States Patent Office 3,530,295
Patented Sept. 22, 1970

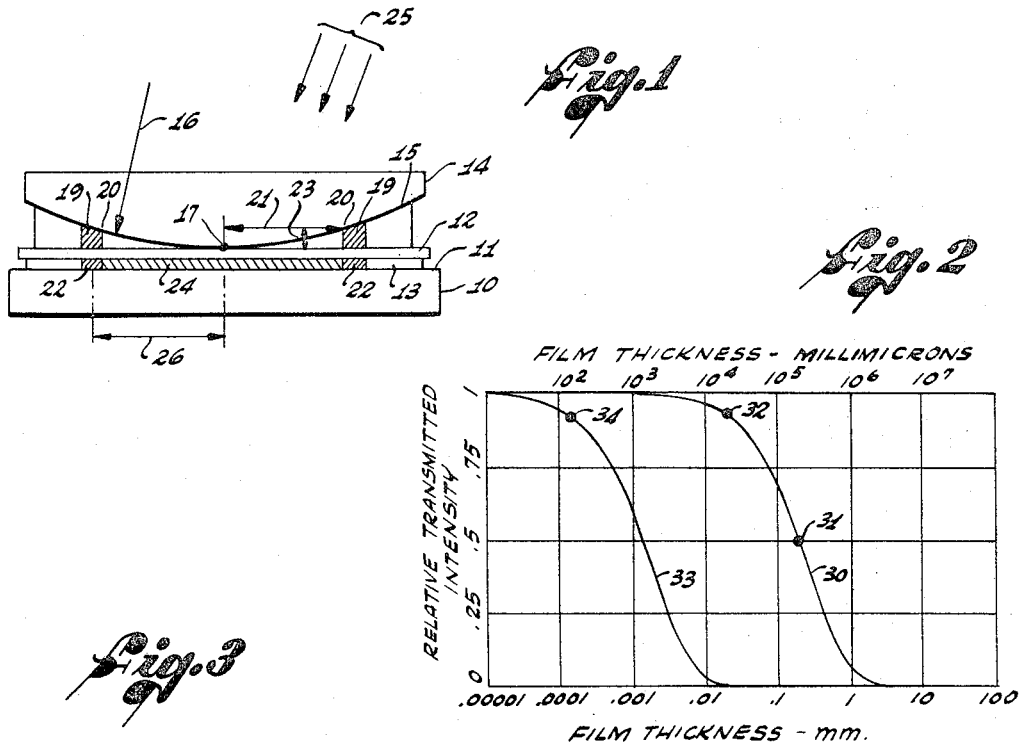
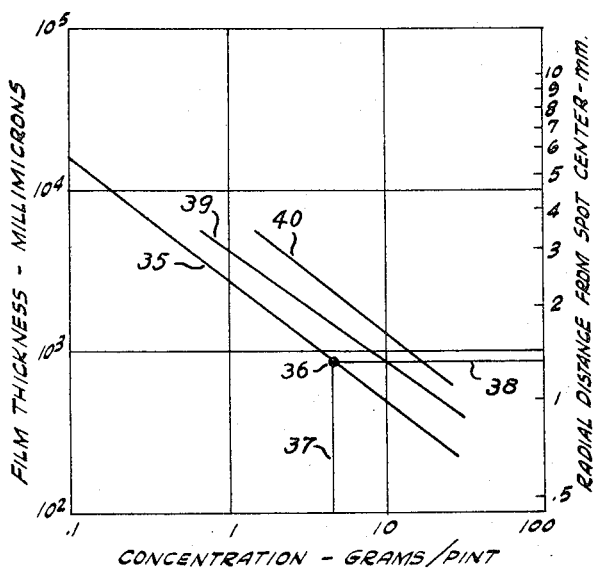
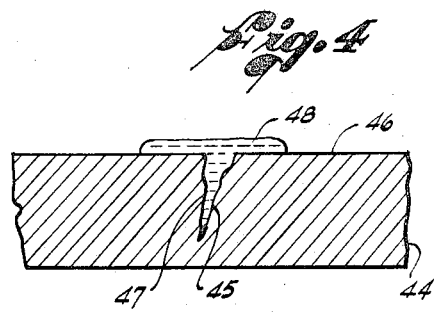
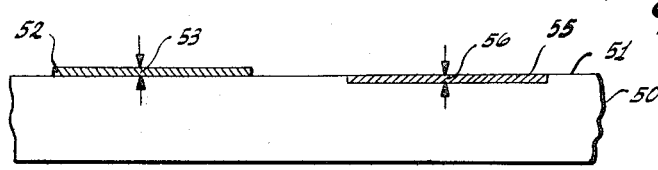
INVENTOR.
James R. Alburger

3,530,295
TRACER PROCESSES EMPLOYING ULTRAVIOLET ABSORBER MATERIALS
James R. Alburger, 5007 Hillard Ave.,
La Canada, Calif. 90046
Original application Oct. 4, 1965, Ser. No. 492,674, now Patent No. 3,386,920. Divided and this application May 22, 1968, Ser. No. 731,225
Int. Cl. G01n 21/16
U.S. Cl. 250—71     4 Claims

ABSTRACT OF THE DISCLOSURE

An inspection process and inspection tracer compositions which utilize ultraviolet absorber dyes dissolved in liquid or resinous carriers. The tracer compositions disclosed may be used in the detection of surface defects in fluorescent plastic parts, or in conjunction with various fluorescent substrates, whereby the presence of the tracer is revealed, under ultraviolet irradiation, as a black non-fluorescent indication against a fluorescent background.

---

The present application is a division of my copending application, Ser. No. 492,674, now Pat. No. 3,386,920, filed Oct. 4, 1965, for "Process for Fluorescence Detection of Extremely Small Flaws," which latter application was a continuation-in-part of my application, Ser. No. 323,529, filed Nov. 13, 1963, for "Fluorescent Tracers," which other application was a continuation-in-part of my application, Ser. No. 149,061, filed Oct. 31, 1961, for "Fluorescent Tracers," which last application was a continuation-in-part of my application, Ser. No. 82,374, filed Jan. 13, 1961, for "Fluorescent Penetrant Tracers." The present invention relates to tracers which exhibit ultraviolet-absorption response in relatively thin films, and more particularly to a method of preparing ultraviolet-absorbing tracers.

The tracers of the present invention are similar in many respects to fluorescent tracers, except that they absorb ultraviolet radiation without producing any fluorescence emission. Fluorescent tracers are well known in the prior art, and have usually been comprised of one or more fluorescent dyes dissolved in a suitable carrier material. These tracers have found advantageous usage in industrial inspection processes. Thus, such tracers have been employed in the detection of surface flaws in parts constructed of metal, ceramic, or other material. When used for this purpose, the fluorescent dye and carrier is utilized in the form of a penetrant liquid which forms entrapments in the flaws and renders the latter more readily detectable than might be the case with ordinary visible colored dyes. Fluorescent tracers are also employed in the form of solutions of fluorescent indicator dyes in thin layers of liquid, plastic, waxy, or resinous materials, and such materials may be used in the preparation of surface coaters, cements, adhesives, potting compounds, and marking materials.

In order to properly understand the novelty and utility of the present invention, it is helpful to refer to certain attributes and performance features of fluorescent tracer materials. In particular, it is especially helpful to consider the features of fluorescent tracers of the so-called inspection penetrant types, which may be utilized for detecting surface defects in critical parts.

In my copending application, Ser. No. 492,674, of which this application is a division, I have pointed out that in the use of fluorescent penetrants for detection of extremely small flaws, it has heretofore been thought that the ability of the tracer to detect the flaws is a function of its fluorescent brightness. Basically, fluorescent brightness, of course, depends upon the particular fluorescent dye or dyes used. However, such brightness can be enhanced by the well-known effect of "cascading of fluorescence." Whereas, the brightness effects produced by a combination of two or more fluorescent dyes are ordinarily approximately additive, cascading involves the transfer of radiant energy from one dye component to another, with a consequent increase in brightness which is more than merely additive.

Since, as has been pointed out, the sensitivity of a fluorescent substance as regards its ability to reveal its presence in micro-traces has been equated with fluorescent brightness, it has often been the practice in industrial inspection processes to attempt to maximize such sensitivity of the fluorescent tracer used by increasing the fluorescent brightness thereof; e.g., through the use of the aforementioned effect of cascading of fluorescence. Thus, when a flaw and its tracer entrapment are so small as to be virtually invisible under black light, it has usually been felt necessary to employ a tracer of increased fluorescent brightness so as to make the flaw detectable. However, in spite of the attempts heretofore made to maximize the sensitivity of fluorescent penetrant materials by increasing the fluorescent brightness thereof, presently known fluorescent penetrant tracers are unable to detect extremely small flaws which may result from such effects as intercrystalline corrosion or "creep cracks," and which may have dimensional magnitudes on the order of $10^{-5}$ to $10^{-6}$ centimeters.

Failure in the prior art to produce fluorescent tracers which are able to detect flaws of such small dimensional magntiude has resulted primarily from the emphasis which has been laid on the fluorescent brightness of the particular dyes employed, as discussed above. Furthermore, it should be noted that in the design of fluorescent tracer liquid compositions in the past, attention has been concentrated on usage of fluorescent dyes or dye-type materials, without any consideration being given to possible advantages to be gained through use of ultraviolet absorber materials.

I have found that in the penetrant inspection of certain kinds of plastic materials for cracks and similar defects, ordinary fluorescent penetrants cannot be employed successfully due to the high levels of background fluorescence or "natural" fluorescence of the plastic. Also, I have found that there are certain situations involving marking, identification, or fraud control, where ordinary fluorescent tracers are not suitable. In many of such usages, it turns out that a properly designed and prepared ultraviolet absorber tracer may yield a useful level of sensitivity performance.

The principal object of the invention, therefore, is to provide improved inspection tracer materials, utilizing ultraviolet absorber materials.

Another object of the invention is to provide tracer processes employing ultraviolet absorber materials.

Still another object of the invention is to provide a method of preparing ultraviolet absorber tracer materials having improved performance features in the presence of fluorescent background materials.

A further object of the invention is to provide ultraviolet absorber tracer features for use in marking and identification.

A still further object of the invention is to provide improved ultraviolet absorber pigment materials.

These and other objects of the invention will in part be obvious and will in part become apparent from the following description thereof when read in conjunction with the accompanying drawings, in which:

FIG. 1 is an illustration, in cross-section, of a Meniscus-Method optical setup which may be used for evaluating the dimensional sensitivity performance of ultraviolet absorber compositions of the invention.

FIG. 2 is a graph illustrating typical ultraviolet absorption response transition effects of ultraviolet absorber compositions as used in the method of the invention.

FIG. 3 is a chart employable in conjunction with the use of the ultraviolet absorber tracers of the invention, a reading of said chart for a particular tracer being shown.

FIG. 4 is a diagrammatic representation, in cross-section, of a surface defect containing an entrapment of ultraviolet absorber tracer, as employed in the method of the invention; and FIG. 5 is a diagrammatic representation, in cross-section, of thin film surface coatings illustrating the use of tracer materials of the invention.

The present invention provides ultraviolet absorber tracers, each of which is formulated essentially by the solution in a suitable solvent of an ultraviolet absorber dye or dye-type substance. Although, for the purpose of the invention, I do not limit myself to any particular ultraviolet absorber materials, I may use one or more ultraviolet absorber substances selected from a group to be defined hereinbelow, and at least to a minimum level of concentration, up to a maximum level of concentration, depending on the solubility limit of the ultraviolet absorber material, as will be described. In order to understand the reason for the set minimum level of concentration, reference should first be made to the concept, which I have formulated, of "thin-film absorption." In accordance with this concept, a fluorescent substance, which absorbs ultraviolet radiation to produce a fluorescence emission, or a nonfluorescent ultraviolet absorber material, which absorbs ultraviolet radiation without fluorescence, when in solution exhibits the characteristic of a threshold of film thickness below which the absorption of ultraviolet radiation effectively ceases. Thus, for a given ultraviolet absorber substance dissolved in a particular carrier at a particular concentration, there exists a specific film thickness below which there is essentially no ultraviolet absorption, and above which there is an absorption response. The threshold thickness of the tracer film may be termed the "dimensional sensitivity" of the fluorescent tracer or the ultraviolet absorber tracer material, as the case may be. The concept of thin-film fluorescence is applicable to ultraviolet absorber substances in solution in a solid form (e.g., as a plastic, waxy, or resinous material) as well as in liquid form.

For the purpose of the present invention, I make a clear distinction between fluorescent sensitizers, such as are disclosed in the parent invention, of which this application is a division, and ultraviolet absorber materials. The ultraviolet absorber materials, such as are employed in the method of the present invention, all act to absorb ultraviolet radiation, yet they do not exhibit any substantial amount of visible fluorescence. Conventional fluorescent dyes or the above-mentioned fluorescent sensitizers, on the other hand, absorb ultraviolet radiation and convert the absorbed radiant energy to a visible fluorescence.

For the purpose of measuring the dimension sensitivity of a fluorescent material in solution, and also of determining the applicable physical constants thereof, I employ a Meniscus-Method instrument, which is described in my U.S. Pat. No. 3,107,298, granted Oct. 15, 1963, for "Apparatus for the Measurement of Fluorescent Tracer Sensitivity." In practicing the invention disclosed in the latter patent, a flat black glass platen is positioned under a black light, and a drop of liquid having dissolved therein a fluorescent substance is placed on the platen. A convex clear glass lens having a preferred radius of curvature of 106 cm. is then placed over the drop of liquid, and so as to rest on the platen. At the point of contact between the lens and the platen, the liquid film has a thickness of substantially zero, and a meniscus-shaped film surrounds said contact point.

In order to evaluate the effect of ultraviolet absorption in thin films of solutions of ultraviolet absorber materials, a modification of the above-described Meniscus-Method setup may be employed, as indicated in FIG. 1.

Referring now to FIG. 1, a polished black glass platen 10 is placed in a horizontal position, and a quantity of brightly fluorescent liquid is placed on the polished surface 11 of this platen. A thin flat cover glass 12 is placed over the liquid so that the liquid forms a thin layer 13.

A clear glass lens 14 having at least one convex surface 15 with a preferred radius of curvature, as indicated by arrow 16, of 106 cm., is placed on the flat cover glass 12 such that it contacts the cover glass at point 17, and a few drops of a test solution of ultraviolet absorber material is introduced between the lens surface 15 and the cover glass 12, forming a meniscus-shaped layer of ultraviolet absorber liquid 18. When the thus-constructed sandwich assembly is irradiated from above by ultraviolet light, as indicated by rays 25, the portions of the layer 18 which act to absorb ultraviolet radiation will cast a shadow on the fluorescent layer 13.

As pointed out in U.S. Pat. No. 3,107,298, the thickness of the liquid film 18 varies continuously with the radial distance from the contact point 17. However, the ultraviolet absorption response as seen under black light is a distinctly nonuniform function, so that a brightly fluorescent "spot" 24 is seen in the region of the contact point 17, and this spot is surrounded by a dark nonfluorescent area. Since the flat platen 10 is made of black glass, the nonfluorescent area surrounding the fluorescent spot appears quite black, so that it contrasts sharply with the spot of fluorescence. At the edge of the fluorescent spot, a zone of fluorescence (or absorption) transition 19 is found, and the point 20 at which this absorption transition just begins to occur can be measured with good accuracy. The diameter of the fluorescent spot is used as a measure of film thickness above which ultraviolet absorption response occurs, and below which ultraviolet absorption substantially ceases. For a given ultraviolet absorber substance dissolved in a particular solvent material, the diameter of the fluorescent spot or the radial distance from spot center, as indicated by arrow 21, varies depending upon the concentration of the dissolved fluorescent substance. A corresponding zone of fluorescence transition 22 is produced, by a shadow effect, in layer 13.

Inasmuch as the geometry of the lens and platen setup is known, and inasmuch as the spot radius 21 can be accurately measured by appropriate photoelectric or other means, the film thickness 23 corresponding to the radial distance 21 can be calculated. Since the transition of ultraviolet absorption response, with respect to film thickness, is really a continuous function, the toe of the transition curve approaches zero response as the film thickness is made smaller, but, theoretically at least, never actually reaches zero. As a practical matter, in locating the point corresponding to the so-called dimensional threshold of ultraviolet absorption, a measurement is made of the radial distance 26 corresponding to the half-brightness point in the transition zone 22. A point on the transition characteristic curve of the tracer is then taken at a film thickness which is one-tenth ($\frac{1}{10}$) the film thickness at the mid-point of the transition curve, where the brightness of fluorescence response rises to a value above about 93% to 98% of the maximum brightness which appears at the center of the fluorescent spot. In the above-mentioned Meniscus-Method test, the diameter of the fluorescent spot would be taken as the distance between the points where brightness response begins to fall fairly steeply, at the 93% to 98% value of maximum brightness, as indicated above.

In my copending application, Ser. No. 492,674, I have described in detail procedures for assigning ratings of dimensional sensitivity to solutions of fluorescent substances. Also, I have described methods which are appropriate for assigning ratings of Specific Sensitivity to the fluorescent substances themselves. These same methods and procedures may be applied to ultraviolet absorber substances.

Referring now to FIG. 2, there is shown here a graph which illustrates the effect of ultraviolet absorption response transition which may be found in an ultraviolet absorber dye or dye-type material. In this graph, the axis of abscissas is set forth on a logarithmic scale in terms of film thickness, and the axis of ordinates is set forth on a linear scale in terms of relative transmitted intensity from zero to unity.

When an ultraviolet absorber substance is dissolved in a solvent carrier to a given concentration, and the transition effect is measured by the above-described Meniscus-Method, an ultraviolet absorption transition curve is obtained similar to curve 30. The mid-point of this transition curve is shown at point 31, at a value of relative absorption of .5, and the point of dimensional threshold is at point 32, which is at a film thickness one decimal order of magnitude smaller than that at point 31.

When the concentration of the dissolved ultraviolet absorber substance is increased, a new transition curve is obtained similar to curve 33, this new curve having essentially the same shape as curve 30, except that it is offset to the left along the axis of abscissas. The dimensional threshold of absorption for the new transition curve 33 is now found at point 34. The points of absorption threshold 32 and 34 usually fall in the dimensional range from about 20,000 millimicrons down to about 40 millimicrons or less, that is, for useful tracer materials.

From an examination of the absorption curves of FIG. 2, it will be understood that as the film thickness of a given tracer liquid is decreased, the effective absorption of the liquid layer will undergo a transition, diminishing toward zero. Thus, for regions in the liquid layer 18 of FIG. 1 in which the film thickness is smaller than the threshold of absorption, then substantially no ultraviolet absorption occurs, and no shadow of absorption will be cast on the fluorescent layer 13 in region 24.

In order for an ultraviolet absorber to be useful as a "dye-tracer," it must first be soluble in a suitable solvent carrier. Second, it must be capable of yielding a dimensional sensitivity value smaller than about 20,000 millimicrons. This latter performance requirement for an ultraviolet absorber tracer composition is, of course, arbitrary; however, practical considerations of tracer performance for the selection of surface flaws by means of inspection penetrants, for example, or for ultraviolet absorption detection of thin coatings of tracer-tagged materials, require that the dimensional threshold of ultraviolet absorption response must be smaller than about 20,000 millimicrons, that is, if the tracer material is to be useful.

It should be mentioned that ultraviolet-responsive dye tracer materials may be divided into two broad but separate categories, namely, normal sensitivity tracers and high sensitivity tracers. As was pointed out in the parent application, Ser. No. 492,674, of which this application is a division, normal sensitivity tracers are those which provide dimensional thresholds of color or fluorescence transition larger than about 250 millimicrons. Also, high sensitivity tracers are those which provide dimensional sensitivity capabilities smaller than about 250 millimicrons. It was further indicated in the above-mentioned parent application that the so-called high sensitivity levels in fluorescent tracer compositions may be achieved by a method of dissolving certain fluorescent "sensitizer" dyes in appropriate carrier liquids to concentrations greater than about 15 grams per pint.

The use of ultraviolet absorber dyes in tracer compositions may likewise be divided into two categories of dimensional sensitivity. Thus, for purposes of inspection penetrant detection of gross cracks, dimensional thresholds of ultraviolet absorption smaller than about 20,000 millimicrons may be required, whereas for the detection of microflaws or for the detection of microscopic traces of residues of resinous materials, for example, dimensional thresholds smaller than 250 millimicrons may be required. In cases where the ultraviolet absorber tracer is to be used as a marker ink or a transfer wax for anti-fraud purposes, it may sometimes be sufficient to provide a dimensional threshold condition smaller than about 1000 millimicrons, but it may in certain cases be necessary to provide a dimensional threshold condition in the tracer composition which is as small or smaller than about 250 millimicrons.

It turns out that each dye material may be assigned a Specific Sensitivity value $(k)$ which defines its capability with regard to color absorption or ultraviolet response in thin films. In accordance with procedures which have now become standard in industry, $k$ values for dyes are measured by use of the so-called Meniscus-Method instrumentation, as described above. Furthermore, it turns out that if the $k$ value of a dye is known, and if its solution concentration $(C)$ is also known, then a Sensitivity Index value $(I_s)$ may be determined such that $$I_s = kC$$

Thus, it is found that the figure $I_s$ is fully descriptive of the ability of a fluorescent dye tracer material to exhibit fluorescence response in thin films. Alternatively, appropriate values may be assigned to the so-called physical constants of the mathematical equation which represents the transition of fluorescence response in thin films of fluorescent dyed materials. In any event, it is possible to properly describe and define the thin-film fluorescence response capability of a given liquid solution or solid solution of fluorescent dye, or ultraviolet absorber dye as the case may be, and it is possible to adjust the dimensional threshold of such ultraviolet response to a value which is smaller than about 250 millimicrons.

If the values of dimensional threshold for an ultraviolet absorber substance are plotted with respect to various values of dye concentration, then a so-called dilution curve is obtained as shown in FIG. 3. Referring now to FIG. 3, there is here shown a graph in which the axis of abscissas is set forth on a logarithmic scale in terms of concentration of an ultraviolet absorber material, and in which the axis of ordinates is set forth on a logarithmic scale in terms of film thickness, or Meniscus-Method spot diameter, or radial distance from spot center, as may be desired. The diagonal line 35 is a locus line for dimensional threshold values for a typical ultraviolet absorber material as used in the method of the invention, a point 36 on this locus line being determined by the intersection of lines 37 and 38, which represent measured values of concentration and film thickness respectively.

It will be seen from an examination of FIG. 3 that if line 35 represents dimensional threshold values for a typical ultraviolet absorber material, then in order for the ultraviolet absorber substance to provide a useful effect as a tracer indicator, it must be present in solution at a concentration which is greater than about .1 gram per pint, and in order to provide a high-sensitivity effect as a tracer, it must be present in a concentration greater than about 15 grams per pint. The unit of concentration measure "grams per pint" is used here for the reason that values in grams per pint are numerically equal to pounds per 55 gallon quantity, and thus a convenient translation is permitted from laboratory tests to production quantities of material.

Measurements of dilution characteristics for various of the ultraviolet absorber substances which are useful in the method of this invention may yield dilution curves corresponding to curves 39 and 40, or other curves in similar locations on the chart. In any event, for a material to be useful as an "inspection tracer," the concentration of the ultraviolet absorber substance must be greater than about .1 gram per pint, and the dimensional threshold condition thus provided must be smaller than about 20,000 millimicrons. The term "inspection tracer" refers, as indicated above, to compositions containing a dissolved ultraviolet absorber ingredient and which yields an ultraviolet absorption response in film thicknesses smaller than about 20,000 millimicrons.

Referring now to FIG. 4, there is here illustrated, in cross-section, a surface crack 45 in the surface 46 of a plastic test part 44 which has a relatively strong natural fluorescence. It is desired here to detect the presence of the surface crack 45 by means of an inspection penetrant process. An inspection penetrant liquid containig a dissolved ultraviolet absorber material is applied to the test part in accordance with appropriate known procedures, whereby there results an entrapment of penetrant liquid 47 in the crack 45. The entrapment of dyed liquid 47 tends to migrate out of the crack 45 so as to form an exuded layer 48 surrounding the crack defect, or it may be drawn out of the crack by means of well-known development techniques.

Among the various development techniques which may be employed are the so-called dry, wet, nonaqueous, and dilution-expansion methods, the last-named method being that which is disclosed and claimed in my now issued U.S. Pat. No. 3,184,596. In any event, a development of a flaw entrapment of inspection penetrant liquid acts to draw the penetrant out of the surface flaw and to produce an effective increase in film thickness of the exuded penetrant liquid. In the case of fluorescent inspection penetrants, development serves to enhance the fluorescent brightness response of the tracer indication, whereas in the case of the ultraviolet absorber inspection penetrant of the present invention, development serves to enhance the ultraviolet absorption response of the exuded entrapment.

The exuded layer of dyed penetrant 48, be it developed or undeveloped, will act to absorb ultraviolet radiation from a black light lamp, such as may be used for inspection of the test surface. The degree of ultraviolet absorption will, of course, depend on the thickness of the exuded layer 48 and the concentration of the dissolved ultraviolet absorber substance in the layer. In any event, and assuming that an ultraviolet absorption effect does occur in the liquid layer 48, an inspection of the test surface under black light will reveal the presence of a more or less nonfluorescent area in the region of the crack defects 45, this nonfluorescent area contrasting sharply with the natural background fluorescence of the test part.

It will be understood that the dimensional threshold of ultraviolet absorption can be adjusted and controlled to meet any desired level of flaw detection sensitivity merely by adjusting the concentration of the ultraviolet absorber material. It will also be understood that the utility of flaw detection penetrants of the ultraviolet absorber type depends on the existence of a natural or induced fluorescence in the test surface. For example, it may be found, in testing a certain plastic material for surface cracks, that the plastic has a significant but weak fluorescence which is strong enough to interfere with the use of a conventional fluorescent inspection penetrant, but which is too weak to provide a good contrasting background for use with the ultravilet absorber penetrants of the present invention. In cases of this kind, a strong background fluorescence may be induced in the test surface merely by staining the plastic test surface with a fluorescent dye which has an affinity for the plastic material.

Referring now to FIG. 5, there is here illustrated, in cross-section, a fluorescent substrate layer 50 on the surface 51 of which there is applied a thin coating of waxy material 52 which is to be used as a marker for identification purposes. In this illustration, it is assumed that the thickness of the absorber layer 52, as indicated at 53, is sufficient to produce a degree of ultraviolet absorption. In such an event, and under black light inspection, the ultraviolet absorber mark 52 will show as a dark, nonfluorescent area, which contrasts sharply with the natural background fluorescence of the surface 51.

Also shown in FIG. 5 is an impregnation or stain mark which may be applied onto a substrate surface. Many fibrous or plastic materials, such as paper, cloth, or clear layers of plastic, may exhibit strong natural or induced fluorescence. In such cases, it is often possible to apply an ultraviolet absorber tracer mark 55 by a process of impregnation. The ultraviolet absorber material is applied to the surface 51 in the form of a liquid solution which penetrates the surface to a depth as indicated at 56. Here again, if the effective thickness 56 of the layer 55 is sufficient to provide an ultraviolet absorption, then the mark 55 will show as a dark nonfluorescent area in contrast with the brighter natural fluorescence of the surface 51.

It is pointed out that the surface on which the ultraviolet absorber mark is applied need not necessarily be fluorescent in order for the ultraviolet absorber material to serve a useful purpose. For example, a clear nonfluorescent sheet of plastic material may be imprinted with a pattern or message by a process of impregnation with a colorless ultraviolet absorber material. In ordinary light, the imprinted plastic sheet will appear to be quite transparent, and under black light inspection no fluorescence of any kind would be observed. However, when the sheet is placed in contact with a fluorescent panel and inspection is carried out under black light, the shadow effect of the imprinted areas will immediately show up as dark areas against a bright fluorescent background. The imprinted areas may also be revealed by photographic processes, in a manner which is described hereinbelow in Example I.

I have discovered that a wide variety of ultraviolet absorber materials exhibit useful features with respect to "inspection tracer" behaviour. A number of such substances, which may be employed in the method of the invention, are listed below. First, though, it should be mentioned that ultraviolet absorber materials have been employed in the past mostly for purposes of screening out the photochemical effects of ultraviolet radiation. In such use applications, the ultraviolet absorber substance has heretofore been dissolved in a suitable solvent carrier material such as a wax or solution of plastic. The thusdyed carrier has then been coated onto a substrate in such a way that an end product is provided which has the property of nontransmittance for ultraviolet radiation. Alternatively, an ultraviolet absorber dye has been impregnated into a suitable substrate such as a sheet of clear plastic, to provide a window-shade sun-screen device.

Ultraviolet-absorber waxes are presently used in the preparation of wax paper bags for containing certain food items, such as potato chips, which may be sensitive to the catalytic action of ultraviolet radiation in turning the foodstuff rancid. Ultraviolet-absorber-dyed plastics are frequently coated onto glass show windows, as in furniture store or the like, whereby the action of ultraviolet radiation in causing fading of colors in fabrics, draperies, rugs, and upholstery is prevented. Also, as indicated above, similar protection against sun-fading may be obtained by using an ultraviolet-absorber-dyed plastic sheet in the form of a sun-screen. In certain types of fluorescent paints, small amounts of ultraviolet absorber dye may be introduced into the paint so as to stabilize the paint from sun-fading, and many kinds of clear plastic materials are treated with minute amounts of ultraviolet absorber dye for the purpose of stabilizing the plastic material from developing a yellow coloration as the result of aging and exposure to daylight. The above-described usages of ultraviolet absorber dyes are quite different in purpose, function, and mode of usage from the "tracer" usage of the present invention. It is only when the ultraviolet absorber substance is employed at a concentration above certain critical levels, as described, that a thinfilm tracer capability becomes evident.

Many of the more useful ultraviolet absorber materials, which absorb ultraviolet radiation without emitting any substantial amount of visible fluorescence, are derivatives of benzophenone. Among such derivatives are:

4,4'-bis-(dimethylamino)-benzophenone (Michler's Ketone)
4,4'-bis-(diethylamino)-benzophenone
2,4-dihydroxy-benzophenone
2-hydroxy-4-methoxy-benzophenone
2,2'-dihydroxy-4,4'-dimethoxy-benzophenone
2,2'4,4'-tetrahydroxy-benzophenone
2-hydroxy-4-methoxy-benzophenone-5-sulfonic acid
2,2'-dihydroxy-4-methoxy-benzophenone
2-hydroxy-4-methoxy-5-sulfobenzophenone-trihydrate
Sodium, 2,2'-dihydroxy-4,4'-dimethoxy-5-sulfobenzophenone
2,2'-dihydroxy-4-n-octoxy-benzophenone
2-hydroxy-4-methoxy-2'-carboxybenzophenone Certain other dyes or dye-type materials may also be used in formulating tracer compositions in accordance with the method of the invention, a few examples of such materials being any one of the group of ultraviolet absorbing agents disclosed in U.S. Pat. No. 2,653,109, or any one of the group of triazine derivatives disclosed in U.S. Pat. No. 2,171,427. A few examples of such materials are:

2,3-diphenyl-quinoxaline
2,3-diphenyl-6-methylquinoxaline
Ethylene glycol disalicylate
5,7-dibromo-8-hydroxyquinoline
Sodium salt of bis-[2-hydroxy-4-phenylamino-1,3,5-triazyl-(6)]-benzidine-disulfonic acid
Sodium salt of 1,4-bis-[2-hydroxy-4-phenylamino-1,3,5-triazyl-(6)-amino]-benzidine-disulfonic acid When an ultraviolet absorber substance is employed in a tracer composition in accordance with the method of the invention, it is dissolved in a suitable solvent carrier, at least to a concentration of about .1 gram per pint in order to provide a so-called "normal" level of dimensional sensitivity, and at least to a concentration of about 15 grams per pint, up to the limit of solubility of the ultraviolet absorber material, in order to provide a so-called "high" level of dimensional sensitivity, the particular concentration which is employed being determined by the desired level of dimensional sensitivity of the tracer composition. Virtually any solvent material may be be used as a carrier for the ultraviolet absorber substance, even resinous or plastic materials, which may carry the ultraviolet absorber as a "solid solution." Inasmuch as different ultraviolet absorber substances may exhibit distinctly different solubility features with respect to different solvent carriers, it is, of course apparent that an appropriate compatible solvent carrier must be selected for use with a given ultraviolet absorber substance, or, conversely, an appropriate compatible ultraviolet absorber substance must be selected for use with a given solvent carrier material; that is, if a satisfactory tracer performance is to be obtained.

Certain of the ultraviolet absorber compounds useful in the method of this invention are soluble in ketones, such as acetone, methyl ethyl ketone, methyl isobutyl ketone, and diacetone alcohol, alcohols such as methanol, ethanol, isopropanol, butanol, and isodecanol, glycols such as diethylene glycol, polyethylene glycol, and glycerin, glycol ethers, such as ethylene glycol monoethyl ether, and ethylene glycol monobutyl etherether, plastic materials, such as polymerized methyl methacrylate, butyl methacrylate, para-toluene-sulfonamide, cellulose acetate, vinyl plastics, such as polyvinyl-chloride, polyvinyl acetate, and polyvinyl butyrate, polystyrene, and liquid epoxy resins, waxy materials, such as triphenyl phosphate, carnauba wax, beeswax, and paraffin, and miscellaneous solvent materials, such as nitroethane, dimethyl sulfoxide, ethyl ether, dioctyl phthalate, N-methyl pyrrolidone, methyl Cellosolve acetate, tetrahydrofuran, silicone oils, and chlorinated hydrocarbons, such as methylene chloride, trichloroethylene, and perchloroethylene. Many of the materials may also be dissolved in water-insoluble inspection penetrants, water-soluble inspection penetrants, and water-emulsifiable inspection penetrants, and, of course, water.

EXAMPLE I

An ultraviolet absorbing stamping ink was prepared as follows:

2,2'-dihydroxy-4,4'-dimethoxy-benzophenone—8 gm.
Dimethyl formamide—18 cc.
Methylene chloride—15cc.
Perchloroethylene—16 oz.

A porous rubber stamp pad was saturated with the above solution. It was found that when the thus prepared stamp pad was used to mark on a plastic sheet material or the plastic base of a photographic transparency, such as a motion picture positive print, the thus-imprinted plastic sheets or films were found to exhibit no visible markings in ordinary light, and no noticeable fluorescence under black light irradiation. However, when the imprinted sheet was placed in contact with an ultraviolet-responsive fluorescent panel, the imprint mark showed clearly as a black mark against a fluorescent background. Also, when an attempt was made to photographically reproduce the thus-marked motion picture positive print, it was found that the ultraviolet absorber imprint became clearly evident in the reproduction, therefore serving to prevent an unauthorized duplication of the photographic film.

EXAMPLE II

A wax crayon composition was prepared as follows:

| | Grams |
|---|---|
| Carnauba wax | 20 |
| Triphenyl phosphate | 5 |
| 2-hydroxy-4-methoxy-benzophenone | 1 |

The above mixture was melted to form a clear solution, and was tested by the modified Meniscus-method to determine the dimensional threshold of ultraviolet absorption. The dimensional sensitivity was found to be smaller than 500 millimicrons. The melted mixture was cast into crayon sticks which were used for making marking impressions on a fluorescent paper. The markings appeared colorless and virtually invisible when examined in ordinary light, but under black light the marks appeared black against a fluorescent background.

EXAMPLE III

A fluorescent tracer having the following composition was prepared:

Ethoxylated nonylphenol (10 mols ethylene oxide per mol of nonylphenol)—1 pint.
2-hydroxy - 4 - methoxy-benzophenone-5-sulfonic acid—95 gm.

The above formulation is a clear liquid which has a pale amber color in ordinary light, but which is highly absorbent for ultraviolet light. It is suitable for marking textile materials for cutting or sewing in the manufacture of garments. It is especially useful on white or light colored fabrics which exhibit a bright fluorescence as a result of treatment with a fluorescent brightening agent. Its dimensional threshold of ultraviolet absorption is about 500 millimicrons.

EXAMPLE IV

An ultraviolet absorber inspection penetrant was prepared as follows:

Dioctyl phthalate—1 pint.
Mixed tetra-substituted benzophenones, including 2,2'-dihydroxy-4,4'-dimethoxy-benzophenone—90 grams.

The above formulation was tested in accordance with the modified Meniscus-method, as shown in FIG. 1, and the dimensional threshold of ultraviolet absorption was found to be about 50 millimicrons, providing a supersensitivity level of flaw detection capability. The penetrant liquid was used in a conventional post-emulsifier inspection penetrant process, in which the penetrant was applied to a fluorescent plastic part for a dwell time of about 10 minutes. The part was then emulsified using standard procedures, and was washed in a spray of water, and was then dried. Inspection of the part under black light showed the presence of dark crack indications against the fluorescent background of the part. The application of a standard nonaqueous inspection penetrant developer was found to intensify the crack indications. Further tests of the above inspection penetrant process were made using a liquid-film dilution-expansion developer of the type disclosed in U.S. Pat. No. 3,184,596. It was found that this type developer also provided an enhancement of the dark crack indications.

EXAMPLE V

The formulation of Example IV was further diluted with an additional amount of dioctyl phthalate so as to provide a concentration of ultraviolet absorber dye of about 9 grams per pint, and the diluted mixture was tested in accordance with the modified Meniscus-Method, its dimensional threshold of ultraviolet absorption being determined to be about 220 millimicrons. Tests of the composition on cracked fluorescent plastic parts showed that the flaw detection capability was equivalent to conventional "standard" to "high sensitivity" fluorescent penetrants.

EXAMPLE VI

The formulation of Example V was further diluted with an additional amount of dioctyl phthalate so as to provide a concentration of ultraviolet absorber dye of about .9 grams per pint, and the diluted mixture was tested in accordance with the modified Meniscus-Method, its dimensional threshold of ultraviolet absorption being determined to be about 2800 millimicrons. Tests of the composition on cracked fluorescent plastic parts showed that the flaw detection capability was equivalent to conventional "low sensitivity" visible dye penetrants, being suitable for the detection of gross cracks.

Although the invention has been described with reference to particular embodiments thereof, it will be understood that various changes may be made therein that lie within the scope of the invention. Therefore, I do not intend to be limited by the specific embodiments, but only by the apppended claims.

I claim:
1. An inspection process in which thin films of dyed tracer material are revealed by an ultraviolet absorption response, the step of applying a dyed tracer to a test sursurface, said dyed tracer material consisting essentially of a nonfluorescent ultraviolet-absorbing substance and a solvent carrier for said ultraviolet-absorbing substance, said ultraviolet-absorbing substance being selectively used singly and in combination and being present in said solvent carrier within the range of proportional concentrations from at least about .1 gram per pint up to about 15 grams per pint.

2. In an inspection process in which thin films of dyed tracer material are revealed by an ultraviolet absorption response, the step of applying a dyed tracer to a test surface, said dyed tracer material consisting essentially of a nonfluorescent ultraviolet-absorbing substance and a solvent carrier for said ultraviolet-absorbing substance, said ultraviolet-absorbing substance being selectively used singly and in combination and being present in said solvent carrier within the range of proportional concentrations from at least about 15 grams per pint up to the limit of solubility of said ultraviolet-absorbing substance.

3. An inspection process in accordance with claim 1 in which said ultraviolet-absorbing substance is at least one member selected from the group consisting of benzophenone derivatives, 4,4' - bis-(dimethylamino)-benzophenone (Michler's Ketone), 4,4' - bis - (diethylamino)-benzophenone, 2,4'-dihydroxy - benzophenone, 2 - hydroxy - 4 - methoxy-benzophenone, 2,2' - dihydroxy-4,4'-dimethoxy-benzophenone, 2,2',4,4' - tetrahydroxy-benzophenone, 2 - hydroxy - methoxy-benzophenone - 5 - sulfonic acid, sodium 2,2' - dihydroxy-4,4'-dimethoxy-5-sulfobenzophenone, 2,2' - dihydroxy-4-n - octoxy - benzophenone, 2-hydroxy - 4 - methoxy - 2' - carboxybenzophenone, 2,2' - dihydroxy - 4 - methoxy-benzophenone, 2 - hydroxy - 4 - methoxy - 5-sulfobenzophenone-trihydrate, 2,3 - diphenyl-quinoxaline, 2,3 - diphenyl-6-methyl quinoxaline, ethylene glycol disalicylate, 5,7 - dibromo-8-hydroxy quinoline, sodium salt of bis-[2-hydroxy-4-phenylamino - 1,3,5-triazyl - (6)]-benzidine-disulfonic acid, sodium salt of bis - [2-hydroxy-4-phenylamino-1,3,5-triazyl-(6)-amino]-benzidine-disulfonic acid.

4. An inspection process in accordance with claim 2 in which said ultraviolet-absorbing substance is at least one member selected from the group consisting of benzophenone derivatives, 4,4' - bis-(dimethylamino)-benzophenone (Michler's Ketone), 4,4' - bis - (diethylamino)-benzophenone, 2,4 - dihydroxy - benzophenone, 2 - hydroxy - 4 - methoxy-benzophenone, 2,2' - dihydroxy-4,4'-dimethoxy-benzophenone, 2,2',4,4' - tetrahydroxy-benzophenone, 2 - hydroxy - 4-methoxy-benzophenone-5-sulfonic acid, sodium 2,2' - dihydroxy - 4,4' - dimethoxy-5-sulfo-benzophenone, 2,2' - dihydroxy-4 - n - octoxybenzophenone, 2 - hydroxy - 4 - methoxy-2'-carboxybenzophenone, 2,2' - dihydroxy-4-methoxy - benzophenone, 2- hydroxy - 4 - methoxy-5-sulfobenzophenone - trihydrate, 2,3 - diphenyl - quinoxaline, 2,3-diphenyl-6-methyl quinoxaline, ethylene glycol disalicylate, 5,7 - dibromo-8-hydroxy quinoline, sodium salt of bis - [2 - hydroxy - 4-phenylamino - 1,3,5-triazyl-(6)] - benzidine - disulfonic acid, sodium salt of bis - [2 - hydroxy-4-phenylamino-1,3,5 - triazyl-(6)-amino]-benzidine-disulfonic acid.

References Cited

UNITED STATES PATENTS 2,953,530   9/1960   Switzer _____ 250—71 X

ARCHIE R. BORCHELT, Primary Examiner

D. L. WILLIS, Assistant Examiner